(12) United States Patent
Gesmundo et al.

(10) Patent No.: US 8,804,545 B2
(45) Date of Patent: Aug. 12, 2014

(54) ARCHITECTURE AND METHOD FOR TRAFFIC MANAGEMENT OF A MONITORING SENSOR NETWORK

(75) Inventors: Vincenzo Gesmundo, Genoa (IT); Igor Bisio, Arquata Scrivia (IT); Mario Marchese, Genoa (IT); Giancarlo Portomauro, Ceriale (IT)

(73) Assignee: Selex Communications S.p.A. (IT)

( * ) Notice: Subject to any disclaimer, the term of this patent is extended or adjusted under 35 U.S.C. 154(b) by 952 days.

(21) Appl. No.: 12/466,041

(22) Filed: May 14, 2009

(65) Prior Publication Data

US 2009/0285154 A1 Nov. 19, 2009

(30) Foreign Application Priority Data

May 16, 2008 (IT) ................ TO2008A0370

(51) Int. Cl.
*H04W 84/18* (2009.01)
*H04B 7/185* (2006.01)

(52) U.S. Cl.
CPC .......... *H04W 84/18* (2013.01); *H04B 7/18584* (2013.01)
USPC ........................................ 370/252

(58) Field of Classification Search
CPC ............... H04B 7/18584; H04W 84/18
USPC ....................................... 370/252
See application file for complete search history.

(56) References Cited

U.S. PATENT DOCUMENTS

| | | | | |
|---|---|---|---|---|
| 7,675,863 | B2 * | 3/2010 | Werb et al. | 370/241 |
| 2003/0063585 | A1 * | 4/2003 | Younis et al. | 370/331 |
| 2003/0174652 | A1 * | 9/2003 | Ebata | 370/235 |
| 2003/0212821 | A1 * | 11/2003 | Gillies et al. | 709/238 |
| 2005/0030921 | A1 * | 2/2005 | Yau | 370/329 |
| 2009/0019056 | A1 * | 1/2009 | Othman et al. | 707/10 |
| 2009/0213822 | A1 * | 8/2009 | Keshavarzian et al. | 370/338 |

OTHER PUBLICATIONS

IEEE 802.15.4 Standard. "Part 15.4: Wireless Medium Access Control (MAC) and Physical Layer (PHY) Specifications for Low-Rate Wireless Personal Areal Networks (LR-WPANs)" Oct. 1, 2003.*

* cited by examiner

*Primary Examiner* — Jason Mattis
*Assistant Examiner* — Stephen J Clawson
(74) *Attorney, Agent, or Firm* — The Belles Group, P.C.

(57) ABSTRACT

A monitoring network is formed by a terrestrial network and a satellite network. The terrestrial network has a plurality of sensor nodes which send a data packets. The data packets are forwarded through sink nodes toward a satellite and a monitoring station in the satellite network. The monitoring station performs a dynamic selection process for dynamically associating each sensor node to at least one selected sink node among the plurality of sink nodes, thereby the data packets sent by the sensor nodes are transmitted to the satellite through only the selected sink node.

20 Claims, 8 Drawing Sheets

ARCHITECTURE AND METHOD FOR TRAFFIC MANAGEMENT OF A MONITORING SENSOR NETWORK

CROSS-REFERENCE TO RELATED APPLICATION

The present application claims priority under 35 U.S.C. §119(a) to Italian Patent Application No. TO2008A000370 filed on May 16, 2008, the disclosure of which is hereby incorporated by reference in its entirety as if set forth fully herein.

FIELD OF THE INVENTION

The present invention relates to an architecture and a method for traffic management of a monitoring sensor network, in particular for a monitoring sensor network having a wireless terrestrial network portion and a satellite network portion, for monitoring remote areas.

BACKGROUND OF THE INVENTION

As known, wireless sensor networks are widely employed for acquiring a wide range of environmental and/or ambient information, such as meteorological data, earthquake data, flooding data, pollution levels, or public safety hazards, such as brush fires, bio-chemical accidents, attacks, etc.

An example of a wireless sensor network is provided in WO 2005/119981 teaching a wireless sensor network, employing a peer-to-peer network architecture for controlling and reporting environmental changes.

In the proposed solution, the information acquired by the sensors is gathered in a monitoring station through local transport routers that communicate directly with the sensor network and the monitoring station. The transport routers are reported as power cell towers, radio transmitters, microwave transmitters. It is thus clear that implementing a sensor network also requires establishing a monitoring station relatively close to the transport routers, in any case in the range covered by them. This known system does not disclose how the information acquired by a plurality of sensor networks can be gathered and analyzed by a unique monitoring station.

To enhance the reliability of sensor networks, US Patent Application 2006/013154 teaches a method to redound sent information packets by forwarding them using a directional flooding technique that preserves the entire network from excessive power consumption. The flooding of an information packet, from a source sensor node to one or more destination nodes, is accomplished in the direction that approaches a destination node on the basis of directional information (minimum hop count). It is therefore possible to obviate the transmission of unnecessary packets and consequently to reduce the whole energy consumption.

The taught method, as well as other blind flooding techniques, minimizes the number of hops each packet undergoes before reaching a destination node, but all packets are treated in the same way, irrespective of the information they carry. Each sensor node sends all packets to its neighbor nodes without performing any selection among them. Thus, the taught method is still inefficient in terms of power saving for the nodes involved in the flooding, and can cause node congestion events that may compromise the management of emergency situations. For example, if all packets are treated so as to minimize the number of hops, some sensor nodes could be overloaded, thus considerably increasing the delay time of all packets transiting there. As a consequence, urgent information could reach the destination node with an excessive delay.

OBJECT AND SUMMARY OF THE INVENTION

The aim of the present invention is to overcome the limitations of the wireless sensor networks according to the prior art.

According to the invention, there are provided an architecture and a method for traffic management of a monitoring sensor network as claimed in the attached claims.

DESCRIPTION OF THE FIGURES

For a better understanding of the present invention, preferred embodiments, which are intended purely by way of example and are not to be construed as limiting, will now be described with reference to the attached drawings (all not to scale), wherein.

DETAILED DESCRIPTION OF THE INVENTION

Figure 1:
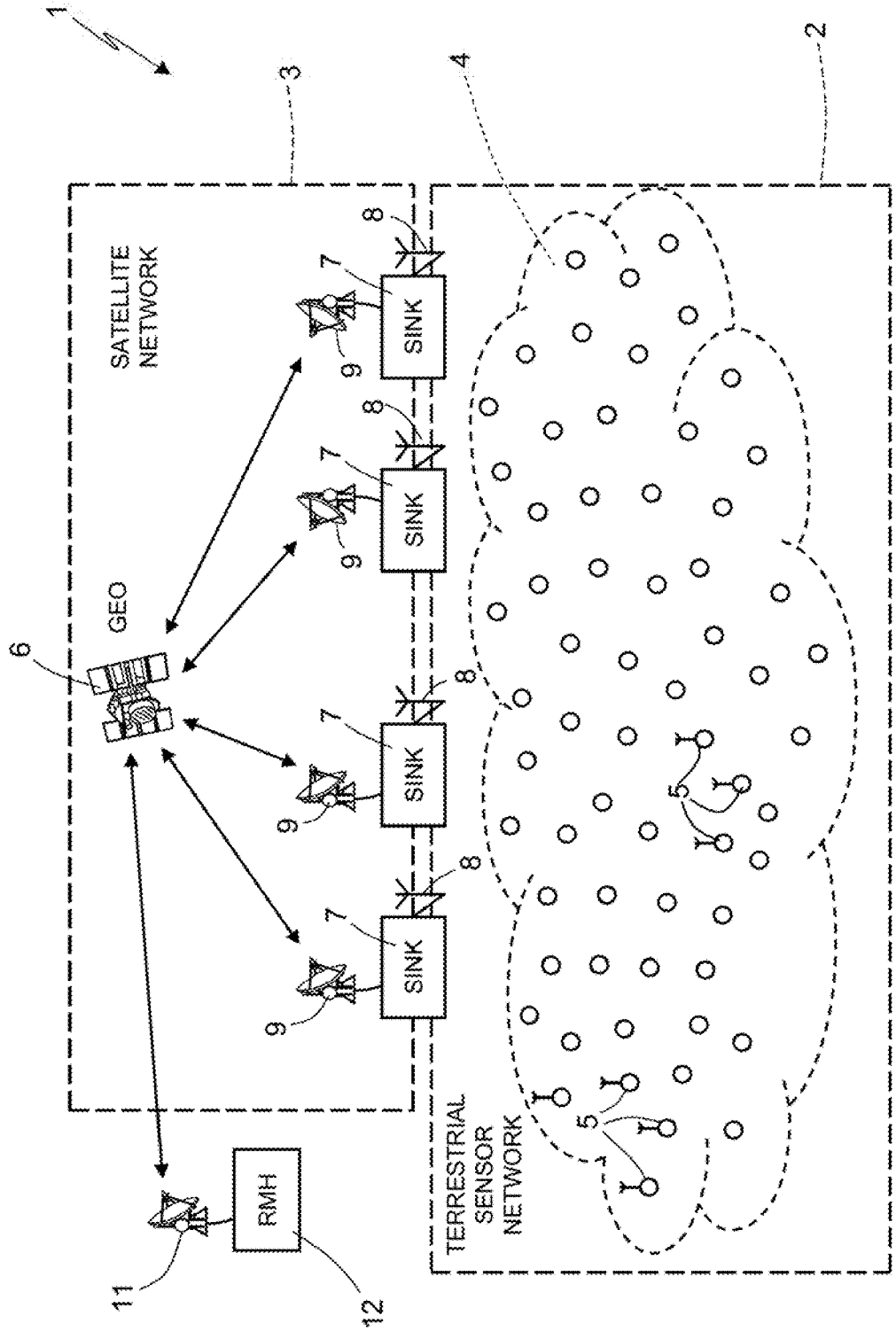
FIG. 1 shows a block diagram of an embodiment of a monitoring network.

FIG. 1 shows a monitoring network 1, comprising two main portions, a terrestrial network 2 and a satellite network 3. The terrestrial network 2 comprises a radio sensor field 4, which in turn includes a plurality of sensor nodes 5. The satellite network 3 comprises at least one satellite 6, for example a geostationary satellite. A plurality of sink nodes 7, that are terrestrial stations, form a communication interface between the terrestrial network 2 and the satellite network 3, wherein each sink node 7 communicates with the sensor nodes 5 through a sink antenna 8 and with the satellite 6 through a sink satellite dish 9.

A remote monitoring host (RMH) 12, that manages data information and alarm situations, communicates with the satellite 6 through a RMH satellite dish 11.

Each sensor node 5 comprises an own sensing device (14 in FIG. 5), able to interact with the environment in which the sensor node 5 is deployed, so as to collect information and transmit, through a sensor node antenna 10, the collected information to a sink node 7, chosen among the plurality of sink nodes 7 through a sink selection process, as explained more in detail afterwards.

Specifically, the sink selection process is used to dynamically assign one sink node 7 to one or more sensor nodes 5, on the basis of one or more quality of service (QoS) metrics. The QoS metrics are used, during the sink selection process, to select the sink node 7 that allows an efficient communication (for example, in terms of low satellite channel fading value) between sensor nodes 5 and the remote monitoring host 12. Examples of QoS metrics that may be employed are the energy spent for an information to travel from the sensor node 5 that generated it to the sink node 7; the time for an information to reach the remote monitoring host 12; the delivery load of sensor nodes 5 and sink nodes 7; the fading level of the satellite channel seen by each sink node 7. As explained in more detail hereinafter, the sink selection process is periodically repeated to associate each sensor node 5 with one sink node 7 so that, during standard operation of the monitoring network 1, the information sensed by a sensor node 5 is transmitted to the remote monitoring host 12 through the associated sink node 7.

Since a sink node 7 may be located far from a sensor node 5 that is transmitting, and in particular out of its radio coverage area, each sensor node 5 generally uses one or more neighboring sensor nodes 5 as intermediate nodes to receive the transmitted information and forward it to another sensor node 5 or directly to the sink node 7. The information, before being transmitted, is organized in data packets.

Each sink node 7 receiving a data packet, processes the data packet (as explained more in detail afterwards) and then forwards it to the satellite 6, which in turn forwards the data packets to the remote monitoring host 12. The remote monitoring host 12 may be anywhere on the Earth surface, in particular it may be placed far from the radio sensor field 4 and the sink nodes 7.

Besides data packets, the sink nodes 7 and the remote monitoring host 12 exchange also control packets and setup packets, needed to implement the sink selection process.

Figure 2:
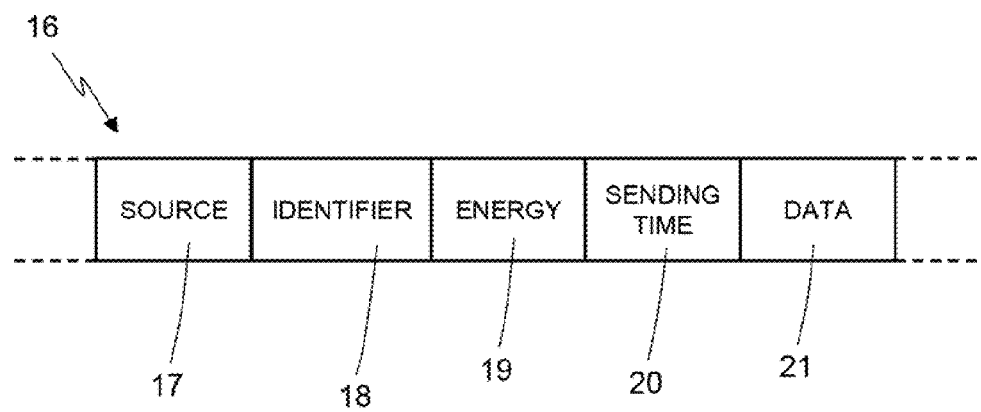
FIGS. 2-4 show the structure of packets exchanged in the present monitoring network.

FIG. 2 shows an exemplary data packet 16, generated by a sensor node 5.

The data packet 16 of FIG. 2 contains a plurality of packet fields: a source field 17, identifying the sensor node 5 that generated that packet; an identifier field 18, identifying each data packet 16 among all the data packets 16 generated by the same sensor node 5; one or more metrics fields specific for one or more QoS metrics that have to be evaluated for each data packet 16, and a data field 21, containing the information data to be transmitted by the sensor node 5. In the considered example, each data packet 16 comprises an energy field 19 which is indicative of the energy spent for a data packet 16 to travel from the sensor node 5 that generated it to a sink node 7 receiving it, and a sending time field 20 which stores the generation time of the data packet 16.

Figure 3:
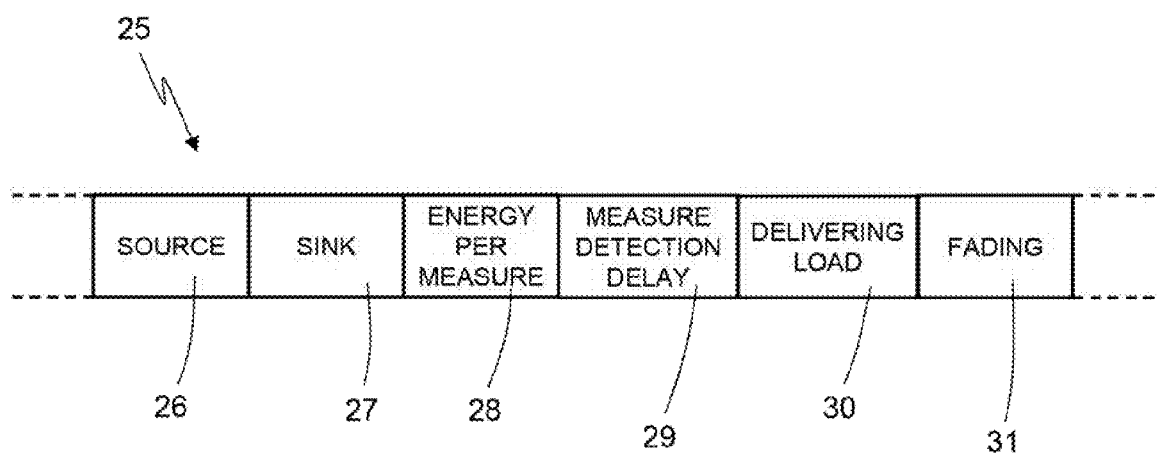

FIG. 3 shows an exemplary control packet 25, as exchanged, during the sink selection process, to exchange control information between the sink nodes 7 and the remote monitoring host 12. In particular, during the sink selection process, each sink node 7 generates a plurality of control packets 25, one for each sensor node 5 from which the considered sink node 7 has received data packets 16. Thus, each control packet refers to data specific to one sensor node 5. Therefore, each control packet 25 comprises a source field 26, containing an identification of the considered source node 5; a sink identification field 27, containing an identification of the sink node 7 sending the control packet 25; and one or more fields, each for a QoS metric, for example an energy per measure field 28, a measure detection delay field 29, a delivered load field 30 and a fading field 31, as explained in more detail hereinafter.

Figure 4:
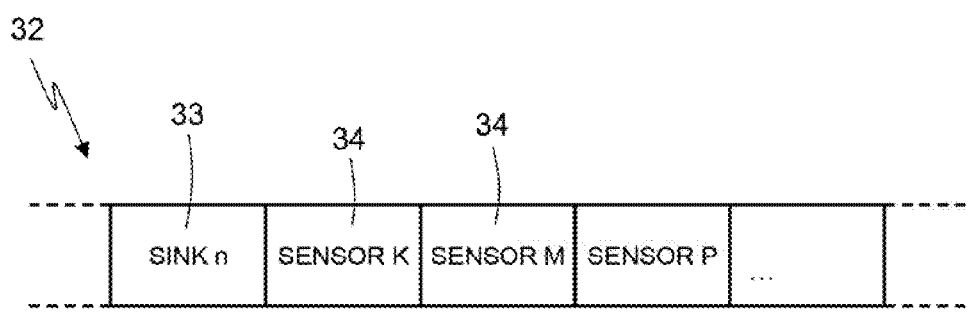

FIG. 4 shows the exemplary structure of a setup packet 32, formed by a destination sink field 33 and by selected sensor fields 34 specifying the sensor nodes 5 associated with the sink node 7 indicated in the sink field 33. Since, in general, the sensor nodes 5 are in greater number with respect to the sink nodes 7, a sink node 7 is associated with more than one sensor nodes 5 and the list 34 contains the identifier of a plurality of sensor nodes 5.

Figure 5:
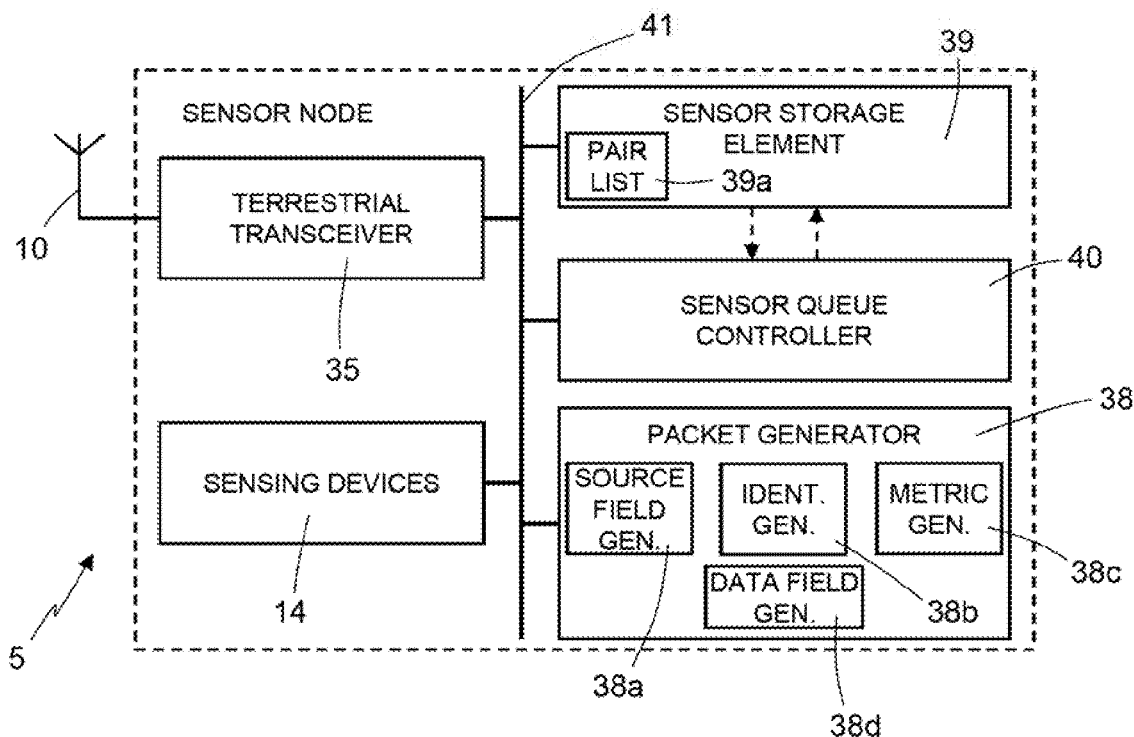
FIGS. 5-8 are block diagrams of components of the monitoring network of FIG. 1.

FIG. 5 is a block representation of the sensor nodes 5. In detail, each sensor node 5 comprises a sensing device 14, aimed at acquiring information from the surrounding environment; a sensor terrestrial transceiver 35, connected to the sensor antenna 10, aimed at transmitting and receiving the data packets 16 to and from other sensor nodes 5 and to the sink nodes 7; a packet generator 38, that, on the basis of the information acquired by the sensing device 14, composes the data packets 16; a sensor storage element 39, aimed at temporarily storing (queuing) data packets 16 before transmission; and a sensor queue controller 40, that manages the queue of the data packets 16 stored in the sensor storage element 39.

The packet generator 38 composes the data packets 16 by filling the source field 15, the identifier field 16, all the fields related to each quality of service metric that has to be optimized (here, the energy field 19 and the sending time field 20) and the data field 21. To this end, the packet generator 38 is schematically shown to comprise a source field generator 38a, an identifier field generator 38b, a metric field generator 38c and a data field generator 38d.

The sensing device 14, the sensor terrestrial transceiver 35, the sensor storage element 39, the packet generator 38 and the sensor queue controller 40 communicate each other through a known bus structure 41, or through any other communication apparatus and method known in the art. The practical realization of the link is not part of the present invention.

Figure 6:
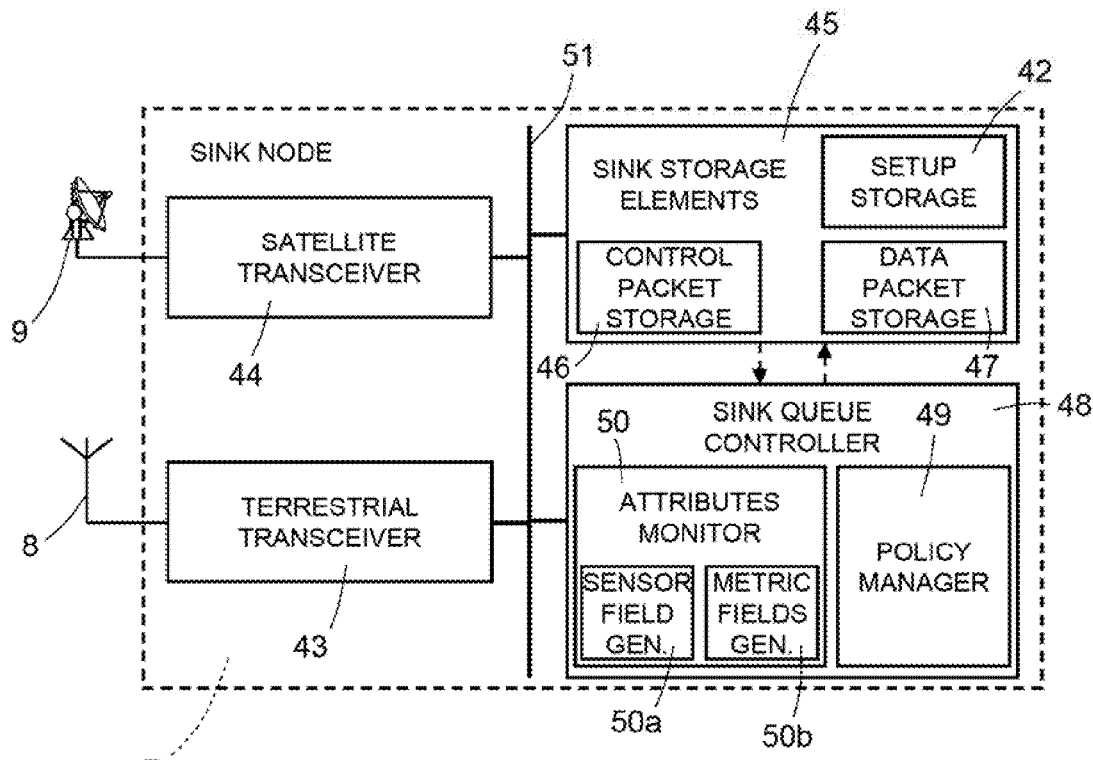

FIG. 6 shows a block representation of the sink nodes 7. Each sink node 7 comprises a sink terrestrial transceiver 43, connected to the sink antenna 8 and aimed at receiving the data packets 16 to and from the sensor nodes 5, as well as at exchanging any further information such as synchro information; a sink satellite transceiver 44, connected to the sink node satellite dish 9 and aimed at transmitting and receiving data packets 16, control packets 25 and setup packets 32 to and/or from the satellite 6, as needed; a sink storage element 45, comprising a control packet storage element 46, a data packet storage element 47, and a setup storage 42, aimed at storing the control packets 25, data packets 16 and setup packets 32, respectively; and a sink queue controller 48, comprising a policy manager 49 and an attribute monitor 50. The sink queue controller 48 is aimed at managing the queues of data and control packets 16, 25 stored by the sink storage element 45 and the attribute monitor 50 is aimed at collecting the QoS metrics to be sent to the remote monitoring host 12 (as better explained later on) and at composing the control packets 25. Therefore, the attribute monitor 50 is schematically shown to comprise a sensor field generator 50a and a metric field generator 50b.

A known bus architecture 51, or any other known communication link, interconnects the sink terrestrial transceiver 43, the satellite transceiver 44, the sink storage element 45 and the sink queue controller 48, so as to allow a communication and data exchange among them.

Figure 7:
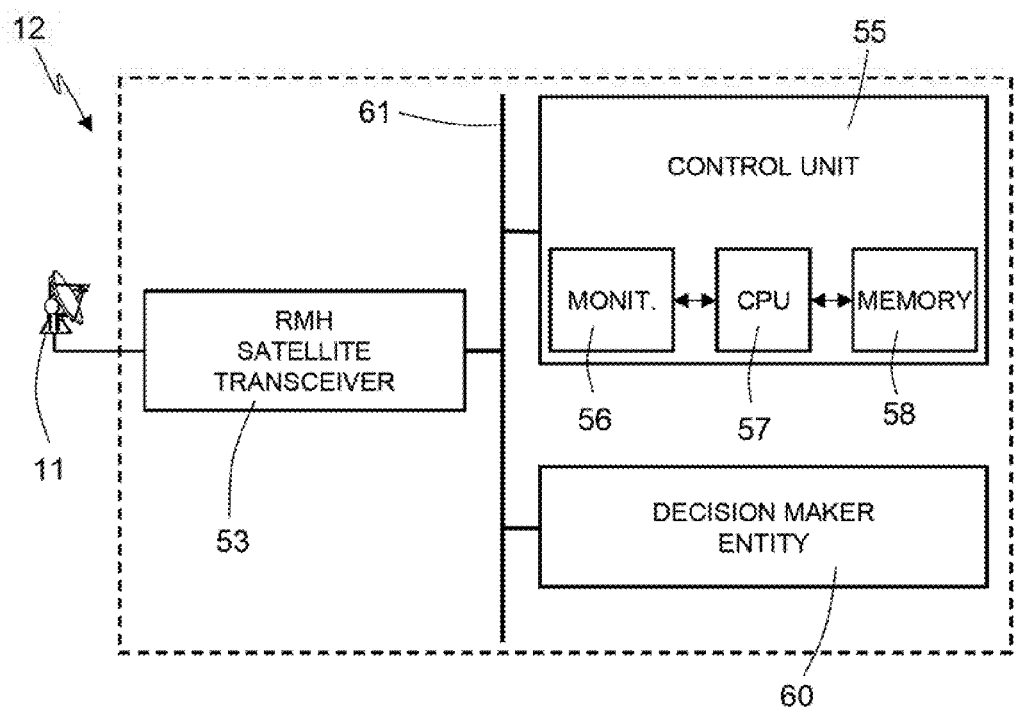

FIG. 7 shows a block representation of the remote monitoring host 12.

Here, the remote monitoring host 12 comprises a RMH satellite transceiver 53, a control unit 55, and a decision maker entity 60, connected to each other through a known bus architecture 61. However, any other known communication structure may be used to allow communication among them.

The RMH satellite transceiver 53 is connected to the RMH satellite dish 11 and is aimed at exchanging with the sink nodes 7, through the satellite 6, data packets 16, control packets 25 and setup packets 32, as described in greater detail later on.

The control unit 55 comprises a monitoring unit 56 receiving and elaborating the data sent through the data packets 16; a memory 58, collecting the data received by the monitoring unit 56 through the data packets 16; and a processing unit 57, acting as an interface between the monitoring unit 56 and the memory 58.

The decision maker entity 60 (described in more detail with reference to FIG. 8) acts as a centralized control, taking decisions during the sink selection process.

Even if in FIG. 7, for reasons of clarity, the decision maker entity 60 is shown as an independent block connected to the control unit 55 to highlight the important function performed thereby, the decision maker entity 60 may be implemented in the control unit 55 itself, as a software program managed by the processing unit 57 and/or the architecture of the remote monitoring host 12 may vary, according to the needs.

Figure 8:
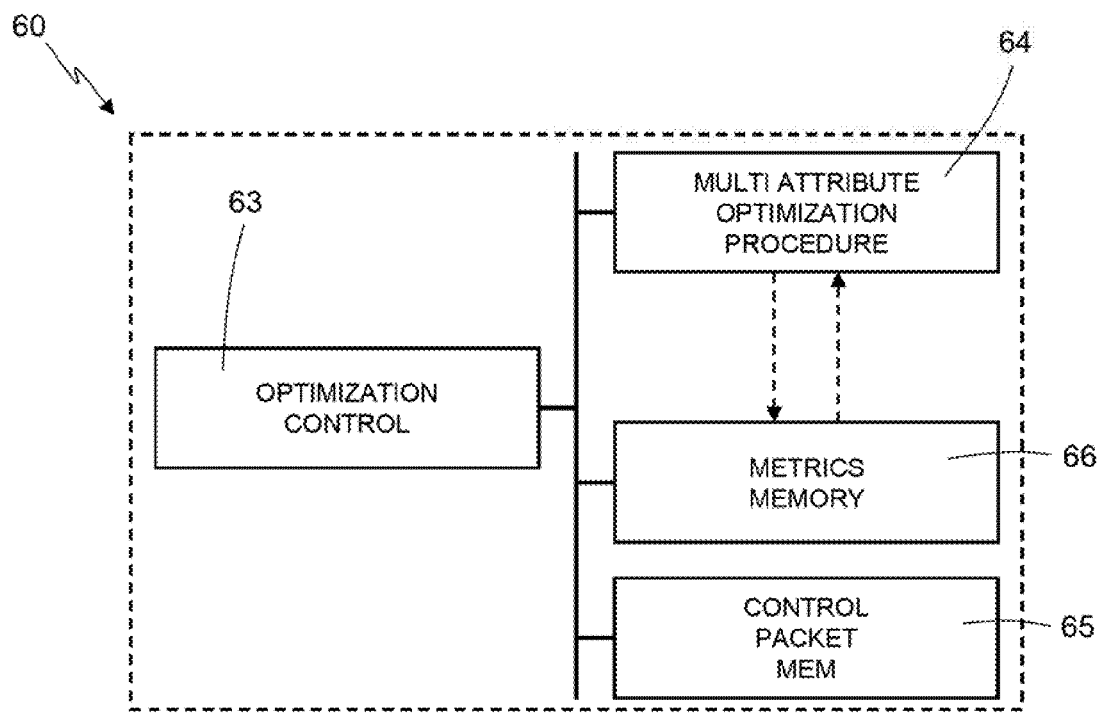

FIG. 8 shows a block representation of the decision maker entity 60 or FIG. 7. The decision maker entity 60 comprises an optimization controller 63, managing the interrogation of the sink nodes 7 and the receipt of the control packets 25 therefrom; a multi-attribute optimization block 64, implementing the sink selection process, as below discussed; a control packet memory 65, storing the received control packets 25, and a metrics memory 66, storing the QoS metrics in one or more decision matrixes, as discussed later on.

As discussed with reference to FIG. 3, in the present embodiment the QoS metrics evaluated to perform the sink selection process are four: energy per measure, measure detection delay, delivered load and fading level.

More in detail, the energy per measure is a measure of the average energy used for transmitting a data package from the generating sensor node 5 to a sink node 7 receiving it, calculated on the basis of the energy fields in the data packets 16 (as shown in FIG. 2). To this end, according to an embodiment, each time a data packet 16 is generated by a sensor node 5, the value of the energy field is set to an initial value, for example 1; any intermediate sensor node 5 that receives the data packet 16 increments the value of the energy field of a predetermined value, for example a unity, and then forwards the data packet 16. These steps are repeated by all the sensor nodes 5 traversed by the data packet 16 until this data packet 16 is received by one or more sink nodes 7. In each sink node 7 receiving the data packet 16, the attribute monitor 50 reads and stores the current value contained in the energy field 19 thereof, together with the respective source field 17, as described also with reference to FIG. 10.

The energy per measure values are collected by the sink nodes 7, which, when requested by the remote monitoring host 12, send an average of the energy values stored for each sensor node 5.

The measure detection delay is calculated from the sending time field 20 in the data packets 16 (as filled in by a sensor node 5 for the first time and not modified by any intervening sensor nodes 5) and is the average time spent by a data packet 16 to travel from the sensor node 5 which has generated that data packet 16 to the sink node 7 receiving such a data packet. In particular, the measure detection delay is an end-to-end measure composed of a propagation delay and of a service and waiting time spent in each node (sensor nodes 5 and/or sink node 7) traversed.

More in detail, when a data packet 16 is received by the sink node 7, the attribute monitor 50 computes the time difference between the time value specified in the sending time field 20 and the current time. In this case, a common clock (not shown) is available among all the nodes 5, 7 of the monitoring network 1. However, the computed time difference is not a complete measure of the delay. In fact, also a waiting time $T_w$ spent by the data packet 16 in the sink node 7, before being processed and forwarded to the satellite 6, is considered. The waiting time $T_w$ is computed by the attribute monitor 50 according to the following formula (1):

$$T_w = D_{num} \cdot T_{ser} = D_{num} \cdot \frac{D_{size}}{C_{sat}}, \qquad (1)$$

wherein $D_{num}$ is a number of data packets 16 currently queued in the data packet storage 47, $T_{ser}$ is a service time of the queue, $D_{size}$, is a data packet size in bits, $C_{sat}$ is the capacity, in bit per second, of the satellite channel on which data packets 16 travel.

Therefore, the measure detection delay value $T_{delay}$, for each data packet 16 received by a sink node 7, is calculated from a reception time value $T_{cur}$ (when the data packet is received) minus a data packet sending time value $T_{send}$, obtained from the sending time field 20, plus the waiting time $T_w$ obtained from the formula (1). The measure detection delay is thus given by the following formula (2):

$$T_{delay} = (T_{cur} - T_{send}) + T_w. \qquad (2)$$

The measure detection delay $T_{delay}$ of each data packet 16 is stored in the sink storage element 45 of the sink node 7. Upon being requested by the decision maker entity 60, the sink nodes 7 calculates the average delay value for all the sensor nodes 5, calculated over the number of packets received by the respective sensor node 5, and send it to the remote monitoring host 12.

The delivering load is computed by the attribute monitor 50, within a sink node 7, and is aimed at weighting the overall load of each sink node 7. To this end, the delivering load field of a control packet 25 contains the measure of the number of data packets 16 received by the sink node 7 within a measuring period (generally, the time between two interrogations by the remote monitoring host 12).

The fading level is strictly related to the satellite channel state seen by the sink nodes 7 and depends upon the signal to noise ratio of the satellite radio channel established between the sink nodes 7 and the satellite 6. A clear sky condition means fading level ideally equal to zero, while, in meteorological conditions adverse for transmission, the fading level is maximum, ideally infinite, and represents a failure of the satellite radio channel.

In particular, in a complete faded situation, the information (control packets 25 and/or data packets 16) sent by the sink nodes 7 are not received by the satellite 6 and, as a consequence, the decision maker entity 60 of the remote monitoring host 12, when it receives no answer from the requested sink node 7, automatically excludes the failed sink node 7 from the sink selection process procedure.

The fading level is monitored by the attribute monitor 50 and is sent to the decision maker entity 60 using the fading field 31 of the control packets 25.

Figure 9:
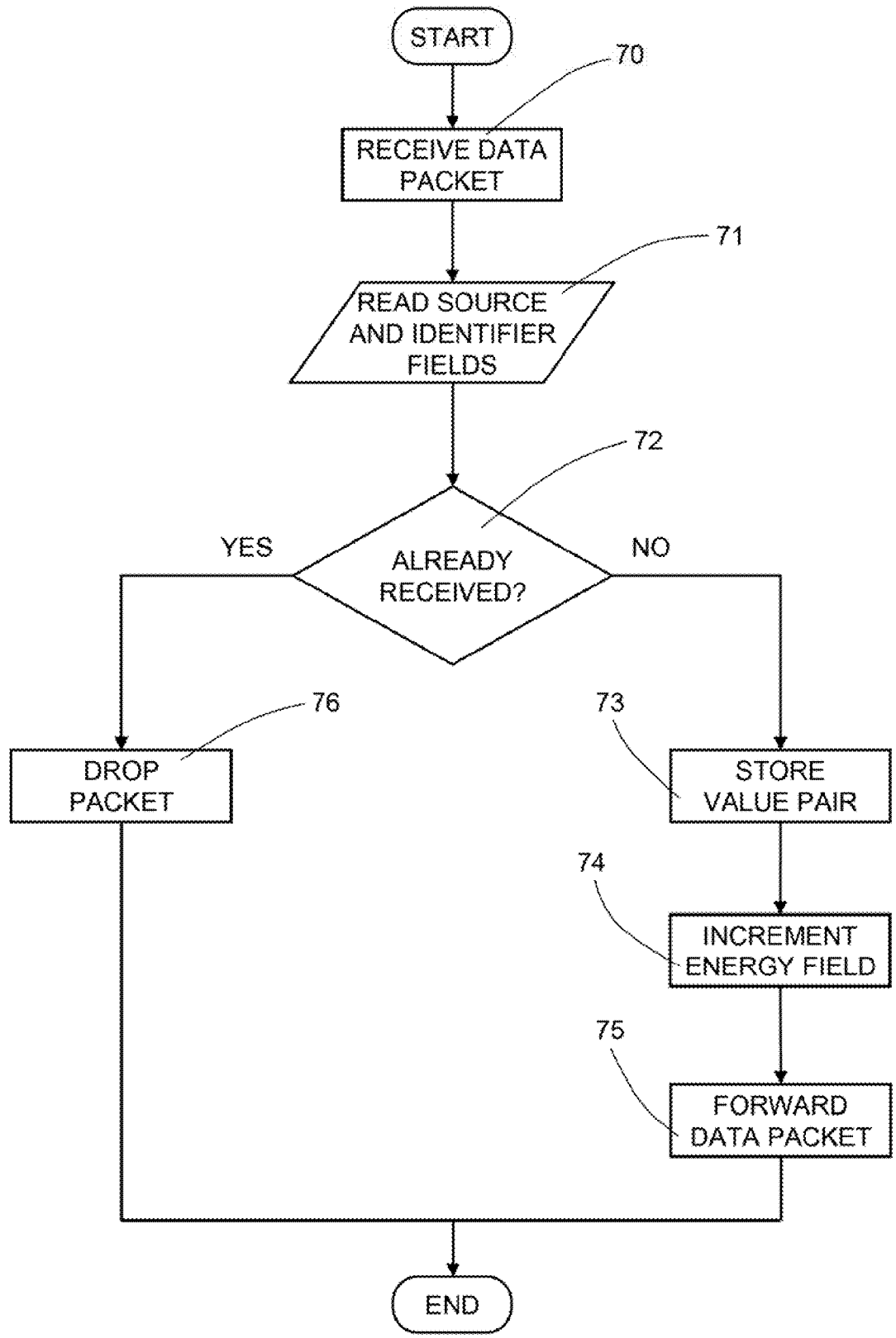
FIGS. 9-11 are flow-charts or the method performed by the present monitoring network.

FIG. 9 is a block diagram showing the management of the data packets 16 by each sensor node 5 within the radio field 4.

In detail, a sensor node 5 transmits, with a fixed periodicity or at any time, upon request by the remote monitoring host 12 or according to particular events and needs, the sensed data through a data packet 16, having the structure shown in FIG. 2. When a k-th sensor node 5 receives a data packet 16 (step 70), the respective sensor queue controller 40 reads the content of the source field 17 and the identifier field 18 (step 71) and checks (step 72) if such content (called value pair) is already stored in a pair list 39a located in the sensor storage element 39 (FIG. 5). In fact, since the value pair specified by the source field 17 and the identifier field 18 univocally identifies each data packet 16 traveling in the sensor field 4, by checking whether the read value pair is already stored, the sensor node 5 knows whether the just received data packet 16 had already been received by the same sensor node 5 and consequently has already been forwarded.

If the value pair is not already stored in the pair list 39a (output NO of step 72), the value pair is stored in the pair list 39a (step 73), the energy field 19 of the data packet 16 is incremented (step 74) and the data packet 16 with the updated energy field is forwarded (step 75). On the contrary, if the just received data packet 16 has been previously received by the k-th sensor node 5 (output YES of step 72), the just received data packet 16 is discarded (step 76).

This approach reduces useless duplications of data packets 16.

Figure 10:
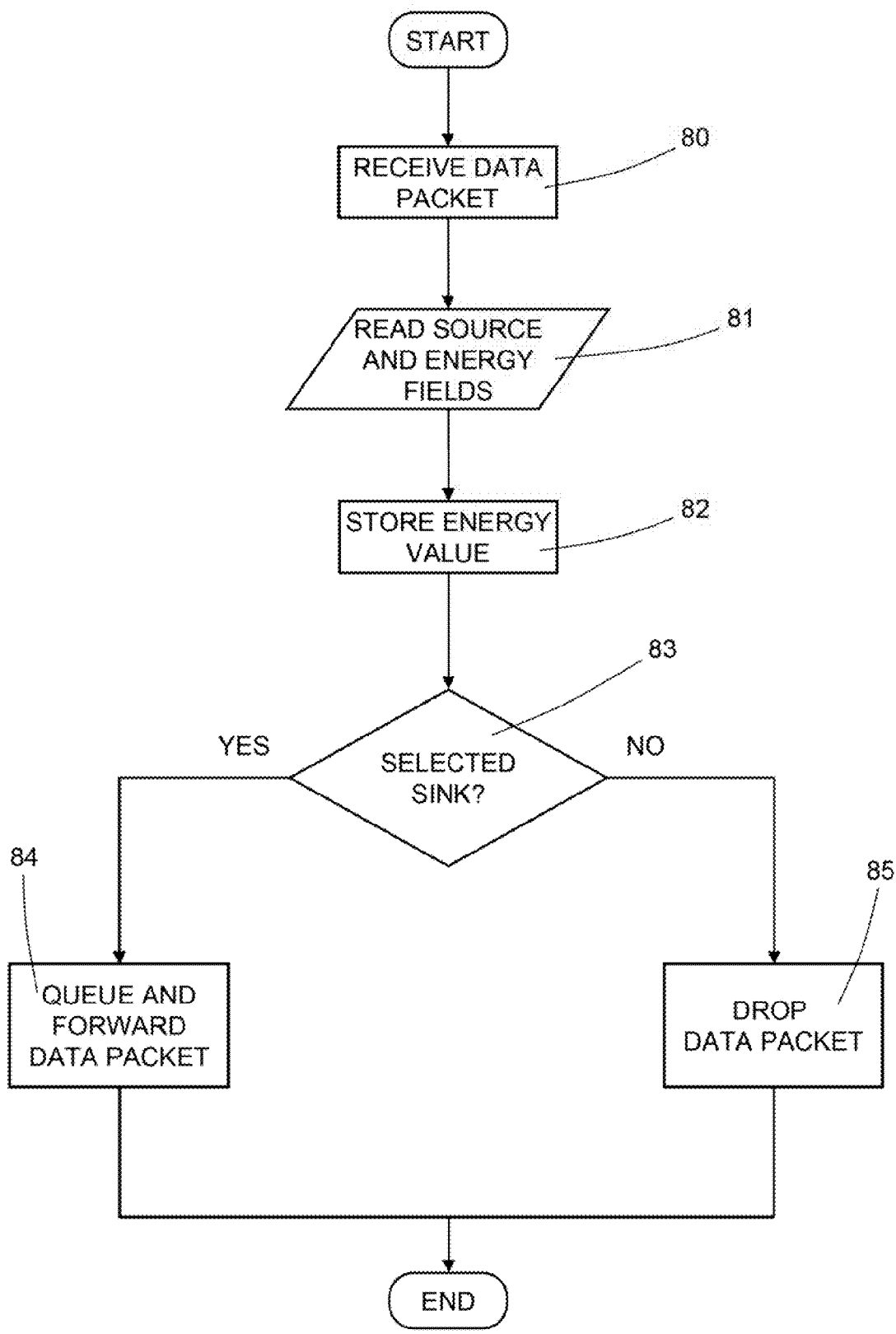

FIG. 10 is a block diagram showing the steps performed by a sink node 7 upon reception of a data packet 16 sent by a sensor node 5. When a sink node 7 receives a data packet 16 (step 80), it reads the source field 17 and the energy field 19 of the received data packet 16 (step 81); stores the value contained in the read energy field 19, together with the source field (step 82); and checks, in the setup storage 42, whether the read source field 17 specifies a sensor node 5 that has been associated therewith in the sink selection process (step 83). If the sink node 7 is associated with the sensor node 5 specified in the source field 17 (output YES of step 83), the data packet 16 is queued in the data packet storage 47 and then transmitted through the satellite radio link (step 84); otherwise (output NO of step 83), the sink node 7 drops the received data packet 16, without forwarding it (step 85).

The sink selection process will be now described. The sink selection process is based on a multi-attribute decision making (MADM) technique; in particular an optimized version of the MADM technique disclosed, e.g., in "Multi Attribute Decision Making An Introduction," by K. P. Yoon, C. L. Hwang, Sage Publications Inc., Thousand Oaks, Calif., USA, 1995. Specifically, a Linear Programming Technique for Multidimensional Analysis of Preference (LINMAP) method is used.

Figure 11:
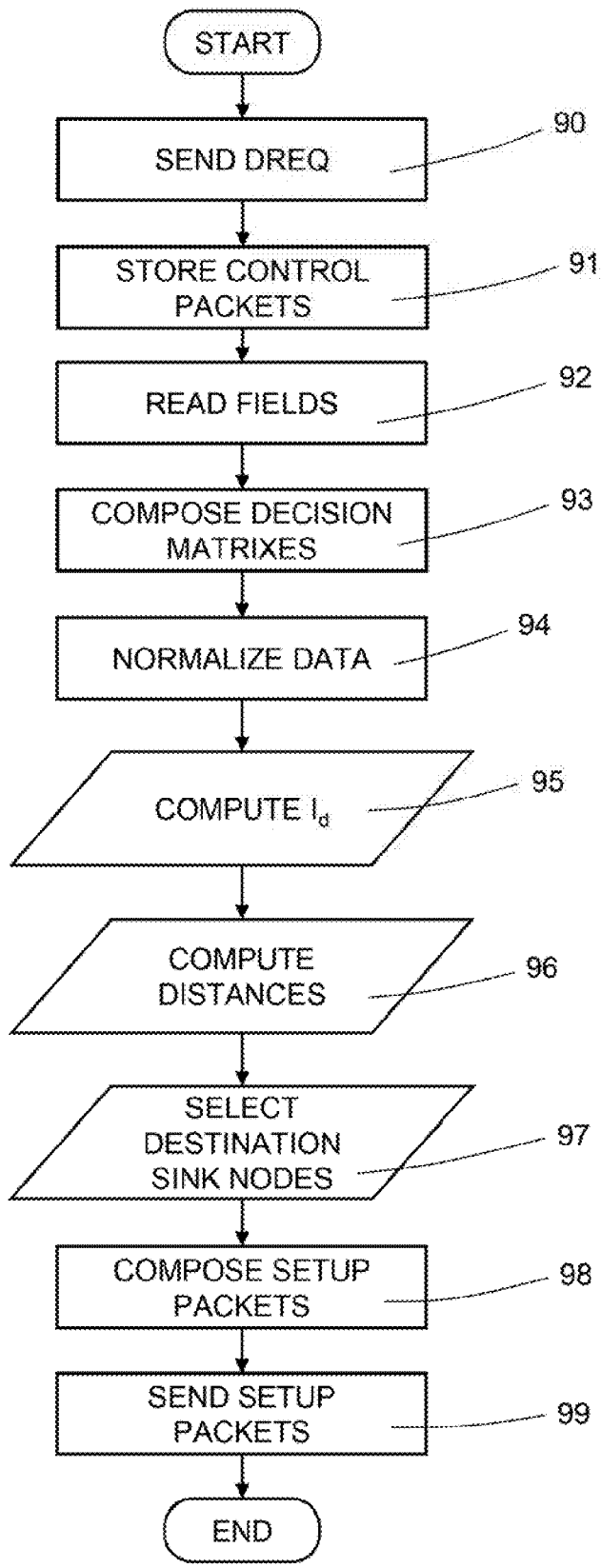
Figures 12, 13:
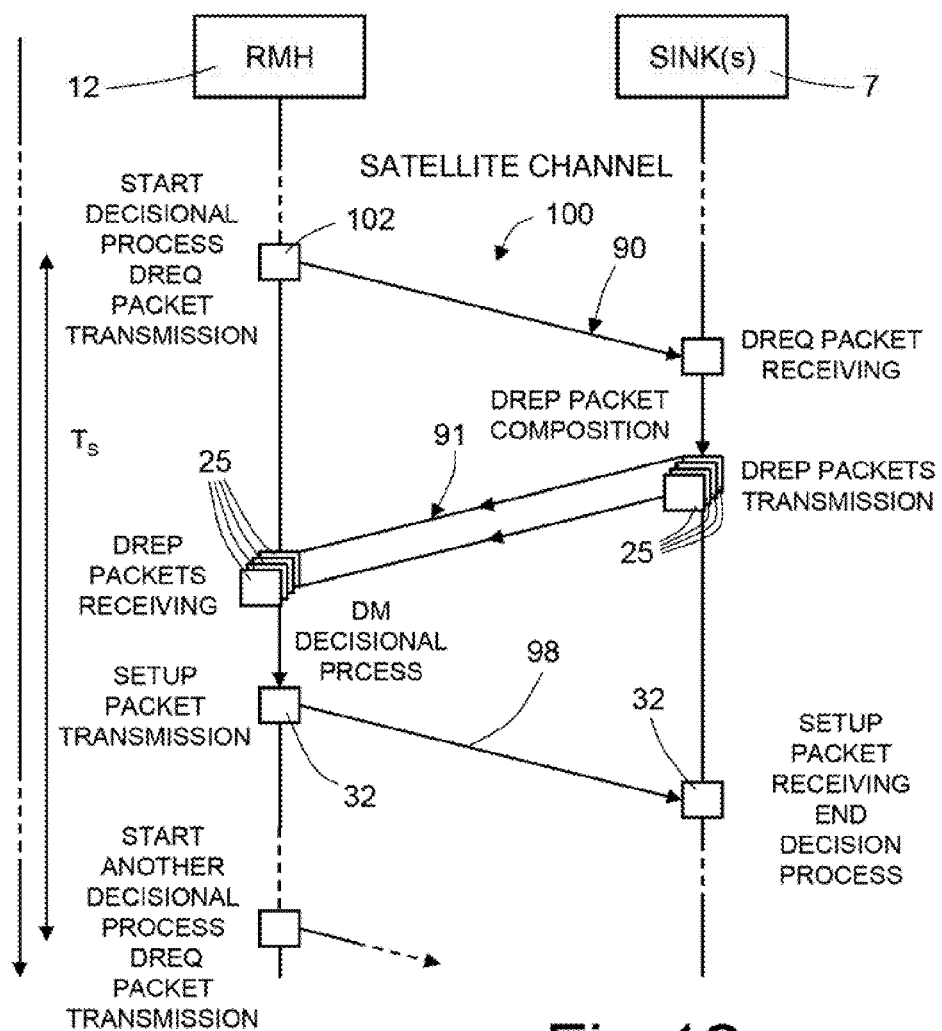
FIG. 12 schematically shows the exchange of information between some components of the present monitoring network.
FIG. 13 shows the structure of a matrix used according to the present method.

The sink selection process, implemented by the multi-attribute optimization block 64, is shown in FIGS. 11 and 12 and begins when the remote monitoring host 12 sends a data collection request to all the sink nodes 7 of the control data (step 90). To this end, the decision maker entity 60 sends to the sink nodes 7, through a satellite channel 100 (FIG. 12), a specific control packet (indicated at 102 in FIG. 12) called decision request (DREQ). The DREQ control packet 102 is sent over a non-interfering portion of the satellite channel 100 and is then broadcasted to all the sink nodes 7. Each sink node 7, upon receiving the decision request DREQ, generates a plurality of control packets 25, one for each sensor node 5 and including the QoS metrics data discussed above. The control packets 25 are then sent to the remote monitoring host 12, which stores them in the control packet memory 65, step 91.

Upon reception of a control packet 25 by the remote monitoring host 12, the decision maker entity 60 reads the source field 26, the sink identification field 27 and the QoS metrics fields 28-31 (see FIG. 3), step 92; then, step 93, the decision maker entity 60 composes N decision matrixes (as many as the sensor nodes 5).

The decision matrixes (see FIG. 13) are multidimensional matrixes, for example two-dimensional matrixes $D_{SN}$:

$D_{SN}$[sink][attributes], having a first index (e.g., the rows) listing all the sink nodes 7 and a second index (e.g., the columns) listing all the QoS metrics values received with the control packets.

As an alternative, only one three-dimensional decision matrix $D_{3d}$ may be used:

$D_{3d}$[source][sink][attributes], having three indexes, the first index listing the source nodes 5, the second index listing the sink nodes 7 and a third index containing the values of the QoS metrics as received through the control packets 25.

As above indicated, during composition of the decision matrixes $D_{SN}$ or the three-dimensional decision matrix $D_{3d}$, if any control packet 25 from a sink node 7 is not received in a specified time (e.g. due to an interruption of a channel or a failure of the specific sink node 7), the first index associated with such sink node 7 is marked as void (e.g., inserting an infinite fading level), so excluding this sink from the set of the possible decisions.

Then, step 94, the attributes in the decision matrixes $D_{SN}$, $D_{3d}$ are normalized over their maximum value (the maximum value of a specific column of the Decision Matrix) $D_{SN}$, so as to smooth the negative effect of the different scale of each single attribute.

Thereafter, step 95, the decision maker entity 60 of the remote monitoring host 12 computes a positive ideal vector $Id_N$ for each decision matrix $D_S$ and, step 96, the decision maker entity 60 calculates the distance, in terms of Euclidean norm, of each row of each matrix $D_{SN}$ from its respective ideal vector $Id_N$[sinks]. The sink node 7 associated with the row of the matrix $D_{SN}$ which is closer, in Euclidean sense, to the ideal vector $Id_N$, then is selected as the destination sink node 7 for that sensor node 5 (step 97).

A numerical example is now provided, in a simple case of only two sink nodes $7_1$ and $7_2$ and two QoS metrics only, for example energy per measure (EM) and measure detection delay (MDD). The energy per measure value is measured in mJ ($10^{-3}$ Joule) and has a maximum value of 2000, while the measure detection delay is measured in ms ($10^{-3}$ seconds) and has a maximum value of 16. Let assume the metrics, at a given time instant t for the n-th sensor node 5, be, for a first sink node $7_1$:

EM(n)=1000 mJ, and
MDD(n)=16 ms, and, for a second sink node $7_2$:

EM(n)=2000 mJ, and
MDD(n)=13 ms.

The normalized QoS metrics, in the decision matrix $D_n$ of that n-th sensor node 5, are:

$D_n$[1][1]=1000/2000=0.5,
$D_n$[1][2]=16/16=1,
$D_n$[2][1]=2000/2000=1, and
$D_n$[2][2]=13/16=0.813.

The components of the ideal vector $Id_n$, associated with the decision matrix $D_n$, will be:

$Id_n$[1]=0.5, and
$Id_n$[2]=0.813.

In this case, the ideal vector for the n-th sensor node 5 at the time instant t is formed with the EM metric of $D_n$[1][1] and with the MDD metric of $D_n$[2][2].

Then, the Euclidean distance of the ideal vector $Id_n$ from the first sink node $7_1$ is:

$$\sqrt{(0.5-0.5)^2+(1-0.813)^2}=0.187,$$

the Euclidean distance of the ideal vector $Id_n$ from the second sink node $7_2$ is:

$$\sqrt{(1-0.5)^2+(0.813-0.813)^2}=0.5.$$

Therefore, the first sink node $7_1$ is at shorter distance from the ideal vector $Id_n$ and thus is selected as the destination sink node 7 for the n-th sensor node 5.

Turning back to FIGS. 11, 12, when the decisional process is completed, the optimization controller 63 in the remote monitoring host 12 composes (step 98) and sends (step 99), to each sink node 7 through a broadcast transmission, a setup packet 32 indicating which sensor nodes 5 are associated with the specific sink node 7.

When each sink node 7 receives the setup packet 32 containing the respective associations, the policy manager 49 thereof stores such information in the setup storage 42.

The sink selection process (FIG. 11) is periodically repeated: the DREQ control packet is sent every Ts seconds (e.g. a few seconds), that is the time during which the sensor nodes 5 are associated with a sink node 7, and it is called selection time. In this way, the monitoring network 1 dynamically adapts to the network state to take into account any degradation and/or failure of the sink nodes 7 and the satellite channel.

The advantages of the present architecture and method are clear from the above description. In particular, the described architecture and method allow a reliable and efficient environmental monitoring based on a satellite and sensor network, thanks to the dynamic association of the sensor nodes 5 to specific sink nodes 7. In fact, the continuous monitoring of the path of the data packets 16 from the generating sink node 5 to all the sink nodes 7 allows the selection of the optimal association, taking into consideration the specific, current conditions of the channel and the intervening components (intermediate source nodes 5, associated sink node 7) and in particular a different selection in case of any failure of either the terrestrial or the satellite component of the network.

The described solution further ensures high quality of service and low energy consumption. In fact, a multi-attribute decision optimization technique is applied for the dynamic selection of the sink node associated with each sensor node 5. This process allows to simultaneously optimize different metrics of interest, in particular delay, which is representative of the provided quality of service, and energy consumption of the monitoring system.

Finally, it is clear that numerous variations and modifications may be made to the architecture and method described and illustrated herein, all falling within the scope of the invention as defined in the attached claims.

For example, the data packet 16 may contain other fields, in particular more fields related to other QoS metrics that measure the quality of the service.

The normalization step may be based on weights, if any attribute(s) is to be given a higher importance in the selection process, based on specific needs of the monitoring network.

Although the above description refers to the association between each sensor node 5 and only one sink node 7, which condition simultaneously ensures the reliability of the system and efficiency, it is possible to associate each sensor node 5 with a reduced number of sink nodes 7 (for example two), at least temporarily, if the conditions of the monitoring network 1 require so, for example in very bad weather conditions when the satellite channel is excessively degraded, to avoid to excessively loosing of data packets, even if this may cause some data packets to be received more than one time. This second solution allows an increase of the reliability to be obtained, in exchange for a reduction of the efficiency.

Numerous variations may be made to the transmission process of the data packets. For example, when a sink node 7 receives a data packet 16 generated by a sensor node 5 not associated therewith, instead of dropping the received data packet, sink node 7 can forward the received data packet to the destination sink, without storing and queuing the data packet 16, thus ensuring that the data packet 16 reaches the destination sink node 7 even if there are problems in the sensor node connections that would prevent the transmission of the data packet 16 directly to the destination sink node 7.

Moreover, the schematic block representation of FIGS. 5-8 shall be considered as indicative of a functional structure that may be implemented, according to the needs, by physical blocks or by software modules, managed by an appropriate processing unit or by a combination of physical blocks and software modules.

The invention claimed is:

1. A method for a monitoring network comprising:
   transmitting a plurality of data packets from a plurality of sensor nodes to a monitoring station through a plurality of sink nodes, wherein each sensor node performs the step of generating said data packets, wherein generating comprises generating a source field and at least one attribute field in each data packet;
   sending the data packets from the sink nodes to the monitoring station through a satellite; and
   dynamically associating, by the monitoring station, the sensor nodes to the sink nodes so that the data packets sent by the sensor nodes are transmitted to the satellite through only one selected sink node among said plurality of sink nodes;
   wherein each sink node performs the step of generating a plurality of control packets, each control packet including a sensor field, univocally identifying a generating sensor node of said plurality of sensor nodes, a sink field, univocally identifying the sink node generating the control packet, and a metric portion carrying quality of service information relating to transmission conditions between the generating sensor node and the monitoring station, the metric portion carrying quality of service information comprising energy consumption, sending delay, sink delivery load, and satellite channel fading level; and
   wherein the metric portions of the control packets include a plurality of metric fields, the step of dynamically associating the sensor nodes to the sink nodes comprises:
   reading the sensor fields, the sink fields and the metric fields of the control packets;
   generating a matrix structure including, for each pair of sensor nodes-sink nodes, the received metric fields;
   computing, for each sensor node, an ideal vector structure having a plurality of maximum values, each maximum value being selected as a maximum among analogous metric fields associated with a same sensor node and different sink nodes in the matrix structure;
   computing distances between the ideal vector and the metric fields of the different sink node; and
   selecting, for each sensor node, a sink node having a minimum computed distance.

2. A method according to claim 1, wherein each sensor node further performs the step of generating, in each data packet, an identifier field univocally identifying each data packet among the plurality of data packets generated by said sensor node, wherein the attribute field carries quality of service information chosen among energy consumption, sending delay and sending time.

3. A method according to claim 2, wherein each sensor node performs the steps of:
   receiving a data packet from another sensor node;
   reading a value pair from the source field and the identifier field of the received data packet;
   checking whether the received data packet has been already received;

if not, storing the read value pair in a pair list storage and forwarding the received data packet;

and wherein checking whether the received data packet has been already received comprises checking if the read value pair is already contained in the pair list storage.

4. A method according to claim 1, wherein each sink node performs the steps of:

receiving a data packet from one of said sensor node;

reading the source field of the received data packet;

checking whether the read source field relates to an associated sensor node; and forwarding the received data packet to the remote monitoring station if the read source field relates to an associated sensor node.

5. A method according to claim 4, wherein generating said data packets further comprises generating an energy field containing an energy value indicative of an energy spent for the data packets to travel from a generating sensor node to a sink node, and forwarding the received data packet includes updating the energy value in the energy field.

6. A method for a monitoring network comprising:

transmitting a plurality of data packets from a plurality of sensor nodes to a monitoring station through a plurality of sink nodes, wherein each sensor node performs the step of generating said data packets, wherein generating comprises generating a source field and at least one attribute field in each data packet, the attribute field configured to carry quality of service information comprising energy consumption, sending delay or sending time;

sending the data packets from the sink nodes to the monitoring station through a satellite; and dynamically associating, by the monitoring station, the sensor nodes to the sink nodes to create a plurality of pairs of sensor nodes-sink nodes, and so that the data packets sent by the sensor nodes are transmitted to the satellite through only one selected sink node among said plurality of sink nodes;

wherein the sending delay is a measurement of an amount of time the data packet spends in the selected sink node prior to being processed and forwarded to the satellite, the energy consumption is a measurement of a number of sensor nodes that the data packet goes through prior to arriving at the selected sink node and the sending time is a measurement of an amount of time it takes for the data packet to be transmitted from the sensor node where the data packet is generated to the selected sink node;

wherein each sink node performs the step of generating a plurality of control packets, each control packet including a sensor field, univocally identifying a generating sensor node of said plurality of sensor nodes, a sink field, univocally identifying the sink node generating the control packet, and a metric portion carrying quality of service information relating to transmission conditions between the generating sensor node and the monitoring station, the metric portion carrying quality of service information comprising energy consumption, sending delay, sink delivery load, and satellite channel fading level; and wherein the metric portions of the control packets include a plurality of metric fields, the step of dynamically associating the sensor nodes to the sink nodes comprises:

reading the sensor fields, the sink fields and the metric fields of the control packets;

generating a matrix structure including, for each of the plurality of pairs of sensor nodes-sink nodes, the received metric fields;

computing, for each sensor node, an ideal vector structure having a plurality of maximum values, each maximum value being selected as a maximum among analogous metric fields associated with a same sensor node and different sink nodes in the matrix structure;

computing distances between the ideal vector and the metric fields of the different sink node; and selecting, for each sensor node, a sink node having a minimum computed distance.

7. A method according to claim 6, wherein each sensor node further performs the step of generating, in each data packet, an identifier field univocally identifying each data packet among the plurality of data packets generated by said sensor node.

8. A method according to claim 7, wherein each sensor node performs the steps of:

receiving a data packet from another sensor node;

reading a value pair from the source field and the identifier field of the received data packet;

checking whether the received data packet has been already received;

if not, storing the read value pair in a pair list storage and forwarding the received data packet;

and wherein checking whether the received data packet has been already received comprises checking if the read value pair is already contained in the pair list storage.

9. A method according to claim 6, wherein each sink node performs the steps of:

receiving a data packet from one of said sensor node;

reading the source field of the received data packet;

checking whether the read source field relates to an associated sensor node; and forwarding the received data packet to the remote monitoring station if the read source field relates to an associated sensor node.

10. A method according to claim 9, wherein checking whether the read source field relates to an associated sensor node comprises checking a setup storage including a list of the associated sensor nodes.

11. A method according to claim 9, wherein generating said data packets further comprises generating an energy field containing an energy value indicative of an energy spent for the data packets to travel from a generating sensor node to a sink node, and forwarding the received data packet includes updating the energy value in the energy field.

12. A method according to claim 6, wherein the step of generating is performed after receiving a data collection request from the monitoring station and comprises:

calculating an average energy spent for the data packets to travel from the generating sensor node to the sink node generating the control packet;

calculating a delay average time spent by data packets to travel from the generating sensor node to the sink node generating the control packet and including queuing times;

calculating an overall load of each sink node generating the control packet; and detecting a channel degradation.

13. A method according to claim 6, wherein the monitoring station performs the steps of:

periodically sending a data collection request to the sink nodes; and receiving the control packets from the sink nodes;

the step of dynamically associating the sensor nodes to the sink nodes including a multi-attribute optimization performed on the basis of data in the metric portion of the control packets.

14. A monitoring network comprising:
a plurality of sensor nodes, wherein each of the plurality of sensor nodes comprises a packet generator configured to generate a plurality of data packets, the packet generator comprising source field generating means and attribute field generating means, the attribute field generating means configured to generate at least one attribute field carrying quality of service information comprising energy consumption, sending delay or sending time;
a plurality of sink nodes; and
a monitoring station;
wherein each of the plurality of sensor nodes is configured to send the plurality of data packets to at least one of the plurality of sink nodes, the at least one sink node configured to send the plurality of data packets to the monitoring station via a satellite;
wherein the monitoring station comprises dynamic selection means for dynamically associating each of the plurality of sensor nodes to a selected sink node of the plurality of sink nodes to create a plurality of pairs of sensor nodes-sink nodes, and so that the plurality of data packets sent by each of the plurality of sensor nodes are transmitted to the satellite through only the selected sink node; and
wherein the sending delay is a measurement of an amount of time the data packet spends in the selected sink node prior to being processed and forwarded to the satellite, the energy consumption is a measurement of a number of sensor nodes that the data packet goes through prior to arriving at the selected sink node and the sending time is a measurement of an amount of time it takes for the data packet to be transmitted from the sensor node where the data packet is generated to the selected sink node;
wherein each sink node comprises a sink queue controller configured to generate control packets, the sink queue controller comprising sensor field generating means configured to generate a sensor field in said control packets univocally identifying a respective sensor node, and metric field generating means configured to generate a plurality of metric fields, each metric field carrying quality of service information chosen among energy consumption, sending delay, sink delivery load, and satellite channel fading level; and
wherein the dynamic selection means are further configured to: (1) red the sensor fields, the sink fields and the metric fields of the control packets; (2) generate a matrix structure including, for each of the plurality of pairs of sensor nodes-sink nodes, the received metric fields; (3) compute, for each sensor node, an ideal vector structure having a plurality of maximum values, each maximum value being selected as a maximum among analogous metric fields associated with a same sensor node and different sink nodes in the matrix structure; (4) compute distances between the ideal vector and the metric fields of the different sink node; and (5) select, for each sensor node, a sink node having a minimum computed distance.

15. A monitoring network according to claim 14, wherein the packet generator further comprises an identifier field generating means configured to generate an identifier field univocally identifying each of the plurality of data packets generated by a respective sensor node.

16. A monitoring network according to claim 15, wherein each of the plurality of sensor nodes comprises a sensor terrestrial transceiver and a sensor antenna exchanging the plurality of data packets to and from other sensor nodes and/or sink nodes, each sensor node further comprising a sensor queue controller and a sensor storage element managing said transmission and/or reception of the plurality of data packets.

17. A monitoring network according to claim 16, wherein the sensor storage element comprises a pair list storage configured to store a content of source field and the identifier field of data packets and the sensor queue controller comprises sensor receiving means configured to receive a data packet from other sensor nodes; reading means configured to read the source field and the identifier field of a received data packet; checking means configured to check whether the read source field and identifier field are already contained in the pair list storage; forwarding means configured to store the read source field and identifier field and to forward the received data packet if the read source field and identifier field are not contained in the pair list storage.

18. A monitoring network according to claim 14, wherein each sink node comprises:
sink receiving means configured to receive a data packet from a sensor node;
reading means configured to read the source field of the received data packet;
association checking means configured to check whether the read source field specifies an associated sensor node of the sink node; and
data packet managing means configured to forward the received data packet only if the read source field specifies an associated sensor nodes of the sink node.

19. A monitoring network according to claim 14, wherein the monitoring station comprises a decision maker entity, the decision maker entity including interrogation means, configured to periodically send requesting packets to the sink nodes and to receive the control packets therefrom; and optimum association selection means, configured to associate each sensor node with a sink node based on said quality of service information.

20. A monitoring network according to claim 19, wherein the optimum association selection means comprises a multi-attribute optimization element, performing dynamic selection of each sink node based on a multi-attribute decision making technique.

* * * * *